March 22, 1966      F. R. CHESTER      3,241,201
SWIVEL CONNECTOR FOR FISHING GEAR AND THE LIKE
Filed Feb. 7, 1964

INVENTOR.
FRANK R. CHESTER
BY Knox & Knox

3,241,201
SWIVEL CONNECTOR FOR FISHING GEAR AND THE LIKE
Frank R. Chester, Carlsbad, Calif.
(245–26 W. Bobier Drive, Vista, Calif.)
Filed Feb. 7, 1964, Ser. No. 343,246
2 Claims. (Cl. 24—73)

The present invention relates generally to swivels and more particularly to a swivel for quick detachable connection between a fish line and hook or lure.

The primary object of this invention is to provide in a swivel structure an improved resilient cage having means incorporated therein for quick detachable connection to a looped line or snelled hook.

It is a further object of this invention to provide an improved swivel formed from non-corrosive materials which are suitable for use in salt or fresh water.

It is a still further object of this invention to provide an improved cage for a swivel which can be formed of readily available resilient stainless steel wire.

Finally it is an object to provide a swivel of the aforementioned character which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

Figure 1:
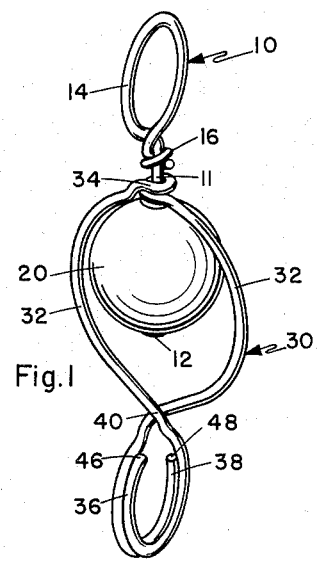
FIGURE 1 is a perspective view of my improved swivel structure.

My improved swivel connector is formed of three elements, a line connector member having a looped end indicated generally by the reference numeral 10, a ball member indicated by the reference numeral 20 and a cage member indicated by the reference 30. The line connector member 10 and the cage 30 are preferably formed of suitable resilient stainless steel wire, the size of the wire depending upon the size of a swivel desired. The ball member 20 is formed of a material which will not corrode when in the presence of stainless steel in either salt or fresh water. Glass, bronze, or stainless steel beads have been found to be suitable for this purpose but some of the synthetic plastics of the required hardness and wear resistance can also be used.

Ball member 20 has a diametrically extending bore 22 therein of a diameter just slightly larger than the diameter of the wire forming the member 10. The shank or journal portion 11 of member 10 extends through bore 22 and is formed on one end with a head 12 to secure the ball member 20 in position. Ball member 20 is preferably rotatably mounted on the shank 11. The end of member 10 opposite the head 12 is formed into a loop 14 in any suitable manner, such as twisting it at 16 about the shank 11, as shown, and a fish line or the like (not shown) may be secured to this loop 14.

Figure 3:
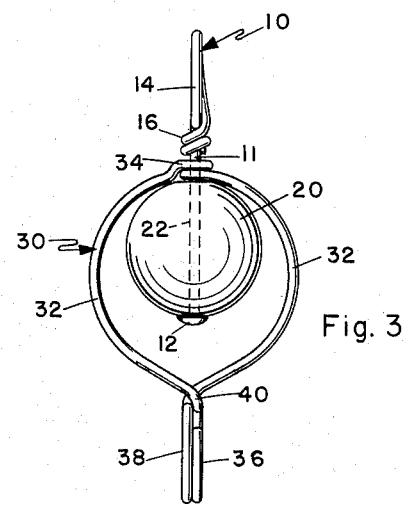
FIGURE 3 is a side view of the swivel.
Figure 4:
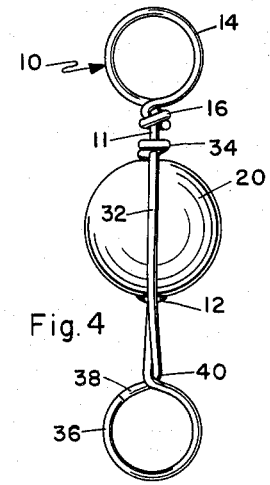
FIGURE 4 is a side view taken at 90° to FIGURE 3.
Figure 5:
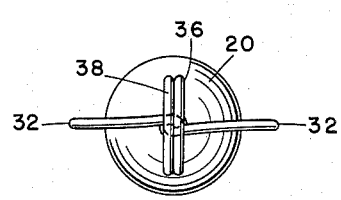
FIGURE 5 is a bottom view of my improved swivel.

Cage 30 is formed into a single generally circular loop 32 and at its midpoint is twisted into a small loop 34 around shank 11 to form a bearing in which the shank 11 is journalled and which will permit rotation of the loop 32 about shank 11. The free ends 36 and 38 of the loop 32 overlap as at 40 at a point diametrically opposite the bearing 34 and are twisted so that they will be contiguous to each other and in a plane which is substantially at right angles to the plane of the loop 32. The ends 36 and 38 are bent back upon themselves through an angle greater than 180° so that they form overlapping hook shaped portions as clearly shown in FIGURE 1. The inherent resilience of loop 32 causes it to expand and force the ends 36 and 38 together as shown in FIGURES 1 and 3.

Construction of my improved swivel is facilitated by using readily available stock material. The cage 30 is first formed from stainless steel wire. A headed shank of stainless steel wire is then inserted in the bore 22 of the ball and through the journal portion 34 and the loop 14 formed as shown. It should be noted that the head 12 is of sufficient diameter to catch on the bearing 34 in the event of fracture of ball 20.

Figure 2:
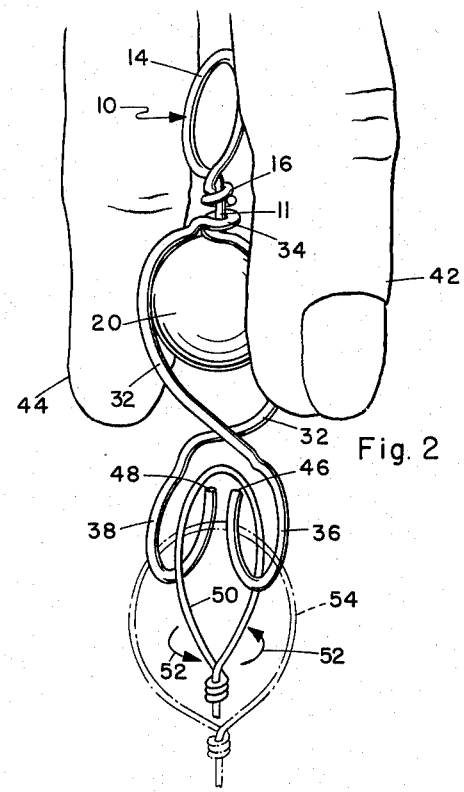
FIGURE 2 is a view showing the method of attaching a looped line to the swivel.

A particularly novel aspect of my improved swivel is the quick detachable feature by which a loop of line or a snelled hook may be secured to the hooked ends 36 and 38. To accomplish this the loop 32 is dimensioned so that it may be gripped between a finger 42 and thumb 44 of one hand and pressure exerted to force the ends 36 and 38 apart as shown in FIGURE 2. A loop of line or the like 50 is then inserted between the ends 36 and 38 so that the uppermost portion of the loop is above the tips 46 and 48 and the loop is then rotated as shown by the arrows 52 so that when pressure on the loop 32 is released the ends 36 and 38 will return to their original position and loop 50 will be interengaged therewith as shown by broken line 54.

My improved swivel connector will not corrode when used in salt or fresh water and does not have to be washed out after use. It is relatively inexpensive to produce and foolproof in operation. Because of the quick detachable connection, it is relatively simple to change hooks or leaders.

It is understood that minor variation from the form of the invention disclosed herein may be made without departure from the spirit and scope of the invention, and that the specification and drawing are to be considered as merely illustrative rather than limiting.

I claim:

1. In a swivel connector for fish lines and the like, comprising: a line connector having a shank with an enlargement at one end; a cage consisting of a single resilient loop twisted into a small loop at one point to form a bearing in which said shank is journalled; said enlargement preventing withdrawal of said shank; said resilient loop having free ends, each end being curved back upon itself through an arc greater than 180°, said curved ends overlapping and being contiguous and disposed substantially normal to the plane of said loop, said loop being dimensioned so that it may be gripped between a finger and thumb of one hand, whereby upon application of squeezing pressure of said cage said curved ends are forced laterally apart to permit insertion of a looped line therebetween and into engagement with both said curved ends.

2. A swivel for fish lines and the like comprising:
a ball member having a bore extending diametrically therethrough;
a resilient cage consisting of a single loop surrounding said ball member and having free ends;
said cage member having a portion twisted into a loop to form a bearing axially aligned with said bore and normal to the plane of said cage;
line connecting means engaged with said ball member and passing through said bore and journalled in said bearing;
said free ends overlapping and being curved back upon themselves through an arc greater than 180°, said free ends also being contiguous and lying in a plane substantially normal to the plane of said cage.

References Cited by the Examiner

UNITED STATES PATENTS

| | | |
|---|---|---|
| 860,090 | 7/1907 | Heidt. |
| 1,236,014 | 8/1917 | Sievert _____ 24—273 |
| 1,313,372 | 5/1919 | Dodge _____ 59—95 |
| 1,771,125 | 7/1930 | Kahle. |
| 1,892,678 | 1/1933 | McIntyre et al. _____ 24—237 |
| 2,448,954 | 11/1944 | Brown _____ 24—236 |
| 3,148,423 | 9/1964 | Anspach. |

FOREIGN PATENTS 825,652   12/1937   France.

WILLIAM FELDMAN, *Primary Examiner.*
BOBBY R. GAY, *Examiner.*